(12) United States Patent
Yeames

(10) Patent No.: US 9,340,260 B2
(45) Date of Patent: *May 17, 2016

(54) FASTENING METHOD AND APPARATUS

(71) Applicant: James E. Yeames, Newport, NC (US)

(72) Inventor: James E. Yeames, Newport, NC (US)

( * ) Notice: Subject to any disclaimer, the term of this patent is extended or adjusted under 35 U.S.C. 154(b) by 339 days.

This patent is subject to a terminal disclaimer.

(21) Appl. No.: 13/762,698

(22) Filed: Feb. 8, 2013

(65) Prior Publication Data

US 2013/0145976 A1     Jun. 13, 2013

Related U.S. Application Data

(63) Continuation-in-part of application No. 12/900,125, filed on Oct. 7, 2010, now Pat. No. 8,397,350.

(60) Provisional application No. 61/249,316, filed on Oct. 7, 2009.

(51) Int. Cl.
  *B63B 21/04* (2006.01)
  *B63B 21/14* (2006.01)
  *E02B 3/26* (2006.01)

(52) U.S. Cl.
  CPC ............... *B63B 21/14* (2013.01); *B63B 21/04* (2013.01); *E02B 3/26* (2013.01)

(58) Field of Classification Search
  CPC ............ B63B 21/14; B63B 21/04; E02B 3/26
  USPC ...... 24/129 R, 115 R, 129 A, 115 K; 114/218, 114/230.26, 364, 223; 256/1, 65.11, 65.05
  See application file for complete search history.

(56) References Cited

U.S. PATENT DOCUMENTS

| | | | |
|---|---|---|---|
| 1,694,312 A | 12/1928 | Clark | |
| 3,454,252 A | 7/1969 | Morgan et al. | |
| 3,497,245 A * | 2/1970 | Metzger | F16L 41/021 228/137 |
| 3,510,156 A * | 5/1970 | Markowz | F16L 5/00 285/122.1 |
| D272,658 S * | 2/1984 | Schoenig | D26/138 |
| 4,466,600 A * | 8/1984 | Tuttle | E04F 11/181 256/21 |
| 4,493,579 A * | 1/1985 | Rautakoura | E04F 11/181 256/65.11 |
| 4,776,719 A * | 10/1988 | Kreider | A63H 33/10 403/24 |
| 5,435,093 A * | 7/1995 | Minorics et al. | 43/19.2 |
| 5,678,865 A * | 10/1997 | Anderson | F16L 47/32 156/294 |
| 6,105,594 A * | 8/2000 | Diaz | 135/16 |
| 6,626,406 B1 | 9/2003 | Olson, Jr. | |
| 6,644,230 B1 * | 11/2003 | Webster | 114/218 |
| 6,688,803 B2 * | 2/2004 | Maria Van Giezen | F16B 7/044 403/245 |
| 7,302,900 B1 | 12/2007 | Stefano | |
| 7,520,233 B1 | 4/2009 | Lyon | |
| 7,744,046 B1 * | 6/2010 | Lundy et al. | 248/121 |
| 2005/0273982 A1 | 12/2005 | Sclalfani | |
| 2008/0087211 A1 | 4/2008 | Sutherland et al. | |

\* cited by examiner

*Primary Examiner* — Robert J Sandy
*Assistant Examiner* — Rowland Do
(74) *Attorney, Agent, or Firm* — Christopher & Weisberg, P.A.

(57) ABSTRACT

A fastening device including a first tube defining a first major axis, a distal portion, a proximal portion, and a through hole, the proximal portion of the first tube including an attachment element. A second tube is disposed within the through hole of the first tube, the second tube defining a second major axis that is substantially orthogonal to the first major axis. The attachment means may be one or more notches, a flange, a socket, a wedge and a clamp, or an arm. The first tube may have a bend, and the bend may be between approximately 25° and approximately 30°. Further, the second tube may define a second tube length, and may include a first component and a second component that screw together to provide an adjustable second tube length. The first tube and second tube may be pivotally coupled.

12 Claims, 14 Drawing Sheets

Provide a fastening device having a main tube 22 and a cord tube 24, the main tube 22 defining a first axis 28, a main tube distal portion 52, a main tube proximal portion 54, and through hole 30, the cord tube 24 defining a second axis 36 that is substantially perpendicular to the first axis 28, a first opening 38, and a second opening 40.

Insert cord 26 defining a first end 42 and a second end 44 through the cord tube 24, the cord 26 entering the first opening 38 of the cord tube 24 and exiting the second opening 40 of the cord tube 24.

Loop cord first end 42 over the main tube distal portion 52.

Apply force to the cord second end 44 to have a first segment 48 of the loop 46 of the cord first end 42 pinch a second segment 50 of the loop 46 of the cord first end 42 against the fastening device 20, thereby holding the cord 26 in place.

*FIG. 4*

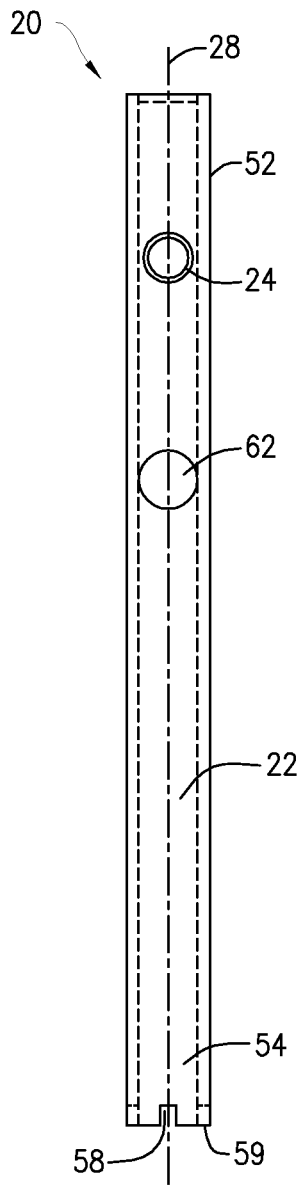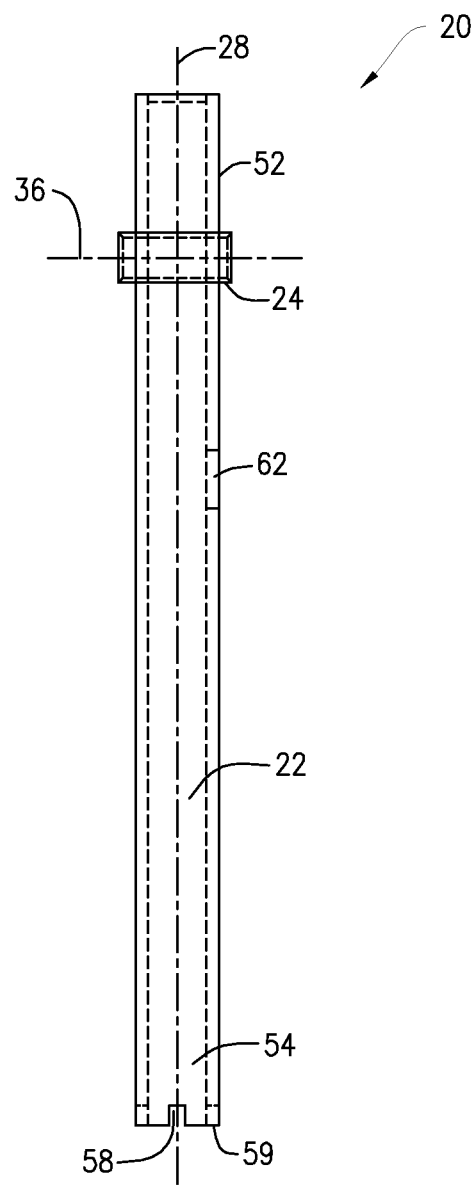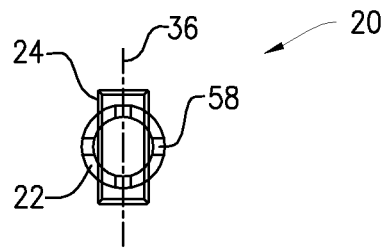
FIG. 5a  FIG. 5b
FIG. 5c

FASTENING METHOD AND APPARATUS

CROSS-REFERENCE TO RELATED APPLICATION

This application is a continuation-in-part of and claims priority to patent application Ser. No. 12/900,125, filed Oct. 7, 2010, entitled FASTENING METHOD AND APPARATUS, which has been allowed, which is related to and claims priority to U.S. Provisional Application Ser. No. 61/249,316, filed Oct. 7, 2009, entitled DEVICE TO ALLOW THE SAFE FASTENING AND INDEPENDENT ADJUSTMENT OF A LINE OR LINES TO A SINGLE FIXED OR REMOVABLE ATTACHMENT POINT SUCH AS A ROD HOLDER ON A BOAT, the entirety of both of which are incorporated herein by reference.

STATEMENT REGARDING FEDERALLY SPONSORED RESEARCH OR DEVELOPMENT n/a

FIELD OF THE INVENTION

The present invention relates generally to fastening devices. In particular, the invention relates to a device to allow the safe fastening and independent adjustment of single or multiple ropes or lines from a single attachment point.

BACKGROUND OF THE INVENTION

In boating, there are many occasions where items need to be tied to a boat, and cleats have traditionally been used as a means for attachment. A typical cleat attaches to a flat surface (such as the deck of a boat or a spar) and features two "horns" extending parallel to the surface to which the cleat is attached. Many boats feature cleats at the bow (for example, to which an anchor line or forward dock line is tied) and at the stern (for example, to which a dinghy tow line or aft dock line is tied). A further use of cleats is to attach auxiliary devices such as fenders or fender boards which provide protection for the hull and sides of the boat.

A cleat hitch is a special knot used to secure a line (e.g., rope) to a cleat. To tie a cleat hitch, a line under load is first brought past the center of the cleat on the outside, and wrapped around under both horns. Next, the line is brought across the cleat and back under the first horn in a figure-eight shape. Then another figure-eight loop is made around the second horn. Finally, the loose end of the line, called the bitter end, is passed under itself such that an increasing strain on the line will pull the knot tighter rather than loosening it.

Other methods of securing a rope to a boat involve the use of hooks or clips. A variety of different kinds of knots may be used to secure a rope to hooks or clips.

However, there are deficiencies to the conventional methods of securing things to a boat. For example, a single cleat is often used for the attachment of more than one line or rope. To adjust an underline, a user is forced to first remove the top line which may result in an unsafe condition or damage to the hull sides.

Another deficiency to the above described conventional methods for securing things to a boat is that cleat hitches are difficult to tie. Novice boaters, and even some experts, can unknowingly make a mistake when tying the cleat hitch. Such a mistake may not be immediately recognized by visually examining the knot. However, a mistied cleat hitch is substantially weaker than a correctly tied cleat knot and may lead to the hitch becoming undone. Further, fastening devices such as clamps and hooks can damage a rope or cord, also resulting in line failure.

Another deficiency to the above described conventional methods for securing things to a boat is that properly tied cleat hitches are not adjustable without being first untied. The load that is pulling on the rope may be very large, and while a properly tied cleat hitch may hold this load in place, the cleat hitch must first be untied if a user wishes to pull this load closer. However, the user may not be able to withstand the load on the rope by himself while attempting to retie the hitch.

Similar deficiencies may be experienced not just in boating, but also in any other activity that requires items to be fastened to a vehicle, structure, or device. For example, awnings or sunshades are commonly used to shade areas of a backyard. However, such awnings or sunshades must be secured to the side of a house or building or to a pole or stake using hardware such as bolts, screws, mounting plates, clamps, D-rings, etc. Furthermore, as the shade stretches over time, fastening cords or chains must be taken up to compensate and prevent sagging. This can not only be time consuming and difficult, but can also involve special tools or equipment. Finally, the point of attachment is permanent and cannot be moved or repositioned.

Such shades are also sometimes suspended above a vehicle or, for example, the bed of a pick-up truck to provide shade for users or protect contents of the vehicle from sun or rain. Additionally, vehicles such as trucks and SUVs are used to haul, tow, or pull loads, such as by using a trailer hitch. However, many conventional trailer hitches are difficult to use when the hitch and/or trailer connection (including pins, rods, ball sockets, etc.) becomes rusted or requires physical force greater than the user can provide.

As another example, animals such as horses, dogs, or cows are commonly tied to hitching posts or to rails, hooks, or rings fastened to a pole or building. It is often necessary to quickly shorten a leash, lead line, or rope to prevent injury to the animal, person, or property. Likewise, providing a quick-release tie is imperative for animal safety. Typical quick-release knots easily become untied as the wrong time and more secure knots can be both difficult to tie and to release in an emergency.

Accordingly, it is desired to provide a means for attaching items to a structure, including a boat, vehicle, or building, that allows attachment of a rope or line that is quick to secure and release, is adjustable, and useful in a variety of situations.

SUMMARY OF THE INVENTION

The present invention advantageously provides a fastening device and assembly, a method of attaching an item to a fastening device, and a kit for a fastening device. The fastening device may include a first tube defining a first major axis, a distal portion, a proximal portion, and a through hole, the through hole may define a first opening and a second opening, the proximal portion of the first tube may include an attachment element, and a second tube may be disposed within the through hole of the first tube, the second tube may define an inner diameter and a second major axis that is substantially coaxial with the first major axis, and the second tube may extend beyond the first opening of the first tube by a distance that is defined at least in part by the inner diameter of the second tube. For example, the distance by which the second tube extends beyond the first opening of the first tube may be between approximately 20% and approximately 30% of the inner diameter of the second tube. The attachment means may be one or more notches, a flange, a socket, a wedge and a clamp, or an arm. The first tube may further define two through holes and the fastening device may include two second tubes, each second tube being disposed within a through hole. The first tube may have a bend, and the bend may be between approximately 5° and approximately 90°. Further, the second tube may define a second tube length, and may include a first component and a second component. The first component may be adapted to screw into the second component, such that the distance over which the first component is screwed into the second component determines the second tube length. Further, the first tube and second tube may be pivotally coupled.

The attachment assembly may include a first tube defining a first major axis, a distal portion, a proximal portion, and a through hole, the proximal portion of the first tube including an attachment element, a second tube disposed within the through hole of the first tube, the second tube defining a second major axis that is substantially orthogonal to the first major axis, and a cord defining a length and a diameter. The through hole defines a first opening and a second opening, and the cord tube may define a length and a diameter, the length of the cord tube being such that the cord tube extends a distance beyond at least one of the first opening and the second opening of the through hole. The distance may be between approximately 20% and approximately 30% of the diameter of the cord.

The kit may include a cord tube defining a diameter and comprising a first component and a second component, the first component defining a threaded portion and the second component defining a threaded receiving bore and the second component having defining, the second component configured to be screwed onto the first component over a distance, and instructions for affixing the cord tube to a structure. The instructions may instruct a user to bore a hole through the structure, the hole having a first opening, a second opening, and a diameter that is greater than the diameter of the cord tube and sufficient to accommodate the cord tube therein, insert the cord tube first component into the first opening of the hole, insert the cord tube second component into the second opening of the hole so that the threaded receiving bore of the second component is disposed about at least a portion of the threaded portion of the first component, provide a cord having a diameter, and screw the cord tube second component onto the cord tube first component over a distance such that at least a portion of the cord tube second component protrudes from the second opening of the hole by a distance determined by the diameter of the cord.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 4 shows a flowchart showing a method of fastening a line to a fastening device;

FIG. 5a shows a side view of a first embodiment of a fastening device;

FIG. 5b shows a front view of a first embodiment of a fastening device;

FIG. 5c shows a bottom view of a first embodiment of a fastening device;

DETAILED DESCRIPTION OF THE INVENTION

Figure 1:
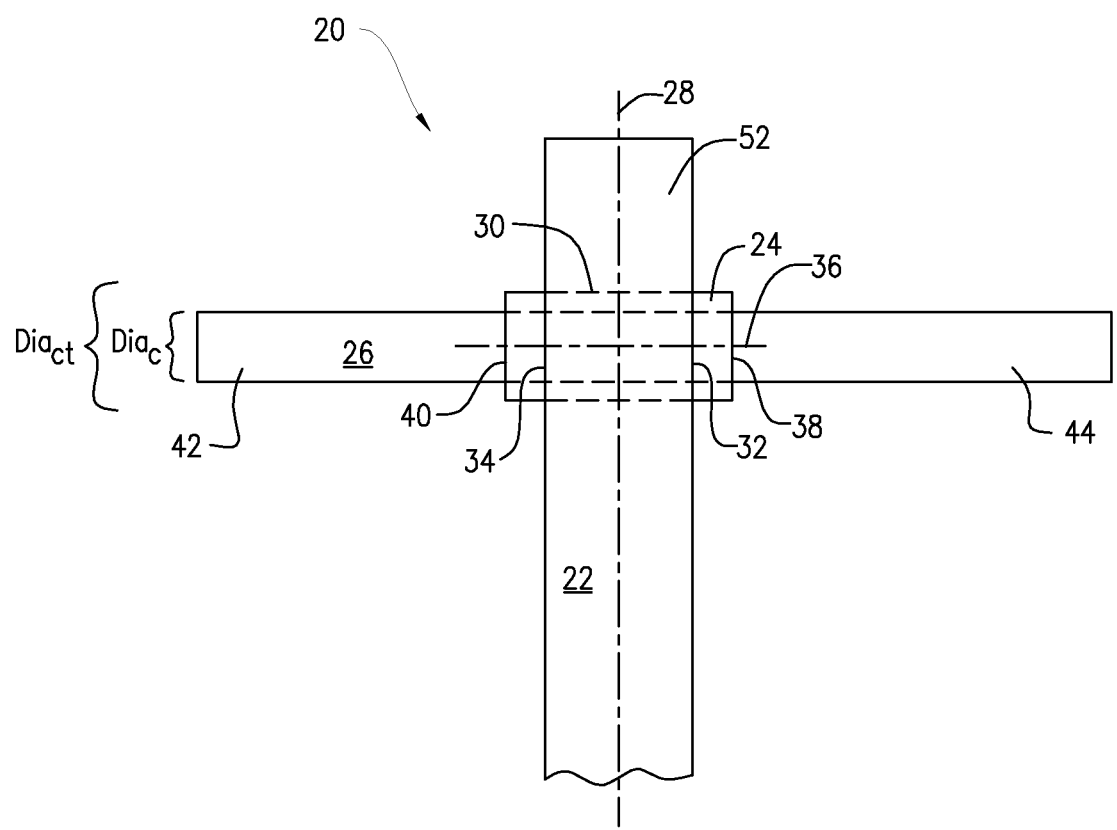
FIG. 1 shows a front view of a first step of fastening a line to a fastening device.
Figure 2:
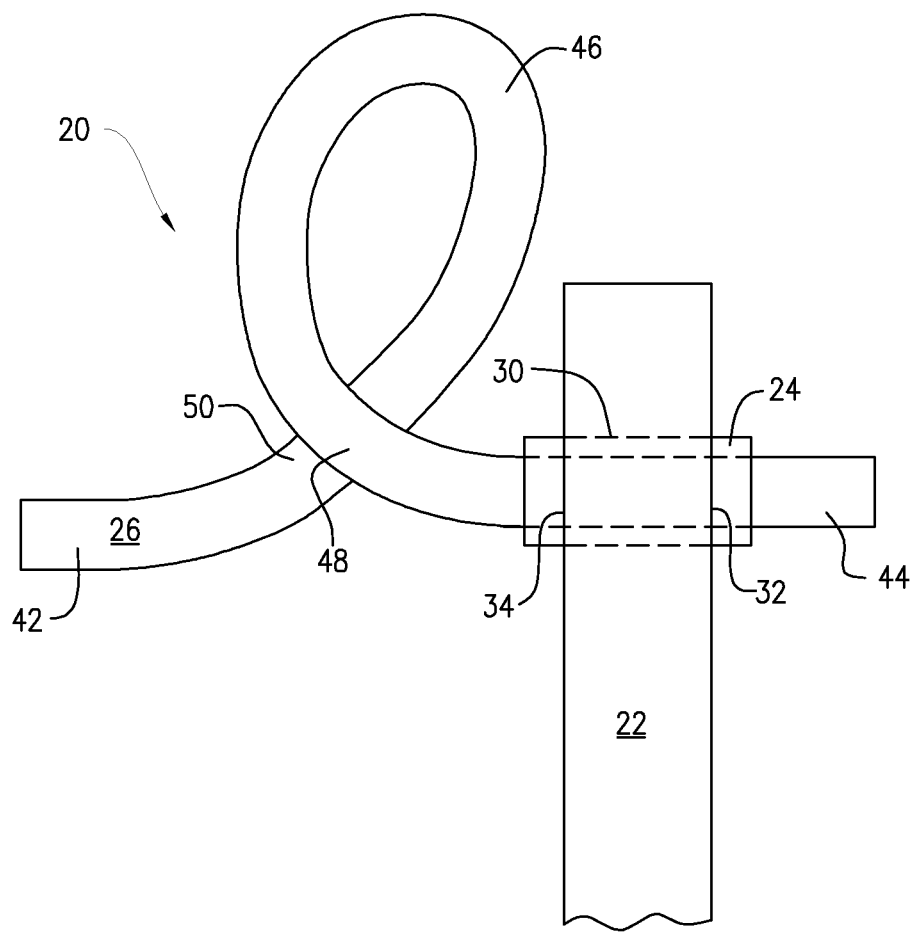
FIG. 2 shows a front view of a second step of fastening a line to a fastening device.
Figure 3:
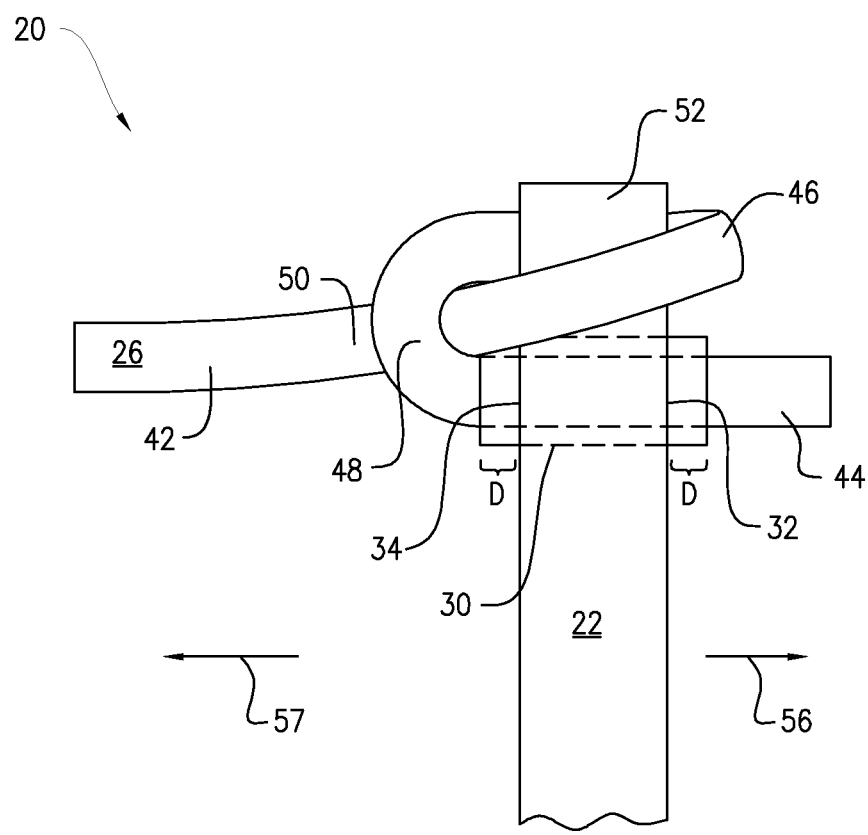
FIG. 3 shows a front view of a third step of fastening a line to a fastening device.

Referring now to FIGS. 1-3, a first, second, and third step for fastening a line to a fastening device are shown. The fastening device 20 may generally include a main tube 22 and a cord tube 24. Both the main tube 22 and cord tube 24 may be composed of materials such as plastic, composite, metal, or any other suitable material. A cord 26 may be attached to the fastening device 20, and may be any suitable type of cord. Example cords include ropes, cables, lines, twine, and the like. The main tube 22 may define a first axis 28 and include a passage 30 (also referred to as a "through hole") extending from a first opening 32 one side of the main tube 22 to a second opening 34 at the opposite side of the main tube 22. The through hole or passage 30 may define a second axis 36 that passes through the first axis 28 and is substantially orthogonal to the first axis 28. By having second axis 32 pass through the first axis 28, tensional forces about the first axis 28 are reduced. The cord tube 24 may be rigidly attached to the interior of the passage or through hole 30 (as shown in FIGS. 1-3), such as by using adhesive bonding, threading, welding, friction, or other suitable means. Alternatively, the cord tube 24 may be pivotable within the main tube 22 (as shown and described in FIGS. 8a and 8b). The cord tube 24 also defines an axis that is coaxial to the second axis 36 when the cord tube is inserted into the through hole 30 of the main tube 22. The fastening device 20 may include a cap, lid, seal, plug, or the like on the distal end that seals the main tube 22 and may provide a decorative feature. For example, a picture or logo may be included on the cap, or the cap may have a decorative shape.

As shown in FIG. 1, the cord tube 24 may define a first opening 38 and a second opening 40 substantially opposite the first opening 38. The cord 26 may define a cord first end 42 and a cord second end 44. The inner diameter of the cord tube 24 may be larger than the diameter of the cord 26 to permit the cord 26 to slide freely within the cord tube 24. As a non-limiting example, the inner diameter of the cord tube may be between approximately 5% and approximately 10% greater than the diameter of the cord 26. Additionally, the cord tube 24 may be chamfered at the first and second openings 38, 40 to minimize or prevent chafing of the cord 26 when the fastening device 20 is in use.

In the first step of fastening a cord 24 to the fastening device 20, the first cord end 42 may be inserted into the first opening 38 of the cord tube 24 and may emerge from the second opening 40 of the cored tube 24. Accordingly, the cord first end 42 is shown in FIG. 1 as protruding from second opening 40 of the cord tube 24, having been inserted all the way through the cord tube 24. The cord second end 44 is shown in FIG. 1 as protruding from the first opening 38 of the cord tube 24. The cord second end 44 may be attached to an item to be fastened to the fastening device, such as a boat bumper.

As shown in FIG. 2, the cord first end 42 is formed into a loop 46 such that a first segment 48 of the cord first end 42 overlaps a second segment 50 of the cord first end 42.

As shown in FIG. 3, the loop 46 of the cord first end 42 is placed over a distal portion 52 of the main tube 22 to complete fastening of the cord 26 to the fastening device 20. A proximal portion 54 of the main tube 22 is shown and described in greater detail in FIGS. 5-7 and 11-13. When pulling the cord second end 44 in the direction indicted by arrow 56, the first segment 48 of the loop 46 of the cord first end 42 pinches the second segment 50 of the loop 46 of the cord first end 42 against the fastening device 20 to lock the cord 26 in place. When pulling the cord first end 42 in the direction indicated by arrow 57, the cord 26 moves through the cord tube 24 in a direction from the first opening 32 to the second opening 34.

To increase the strength of the attachment between the cord 26 and fastening device 20 (or "holding power"), the cord tube 24 extends beyond the through hole 30. For optimal holding power, the cord tube 24 may extend a distance "D" beyond the at least the second opening 34 of the through hole 30. This distance D beyond at least the second opening 34 may be, for example, approximately 20% to approximately 30% of a diameter $Dia_C$ of the cord 26. However, an extension of up to 100% or more of the diameter of the cord may also be used. Alternatively, because the diameter of the cord tube 24 is based at least in part on the diameter of the cord 26, the distance D that the cord tube 24 extends beyond the second opening 34 (and optionally the first opening 32) may be, for example, approximately 20% to approximately 30% of the inner diameter $Dia_{CT}$ of the cord tube 24. Thus, the cord tube 24 will extend from at least the second opening 34, and optionally the first opening 32, by a distance D that is at least, for example, 20% to approximately 30% of the diameter $Dia_C$ of the largest diameter cord 26 that the cord tube 24 will accommodate. For cords with a diameter $Dia_C$ that is less than the largest diameter cord 26 that the cord tube 24 will accommodate, the distance D that the cord tube 24 extends beyond at least the second opening 34 will be greater than, for example, 20% to approximately 30%.

The fastening device is both simple and inexpensive to produce and is easy to operate. Looping the cord 26 around the main tube 22 so that the cord 26 pinches or secures itself against the fastening device 20 both securely fastens the cord 26 and allows the user to adjust the operable length of rope without untying it from the fastening device 20. When force is exerted on the cord 26 in the direction of the load, the attachment tightens. Conversely, when force is exerted on the cord 26 in the direction of the free end of the cord 26, the cord 26 may smoothly slide through the fastening device 20 to shorten the cord distance between the fastening device 20 and the load.

Referring now to FIG. 4, a flowchart for a method of fastening a line to a fastening device is shown. In Step 1, a main tube 22 and a cord tube 24 is provided. The main tube 22 defining a first axis 28, a main tube distal portion 52, a main tube proximal portion 54, and a through hole 30. The through hole 30 may define a first opening 32 and a second opening 34. A cord tube 24 may be inserted into and rigidly or pivotally fixed within the through hole 30, the cord tube 24 defining a second axis 36 that is substantially orthogonal to the first axis 28 of the main tube 22. The cord tube 24 may define a first opening 38 and a second opening 40. The main tube second end 54 may be removably coupled to foundation device (such as those described in greater detail below). In Step 2, a cord 26 may be inserted through the cord tube 24, the cord 26 defining a cord first end 42 and a cord second end 44. The cord first end 42 may be fed through the first opening 38 of the cord tube 24 and emerge from the second opening 40 of the cord tube 24. In Step 3, the cord first end 42 may be looped over the main tube distal portion 52. In Step 4, a load may be placed on or force applied to the cord second end 44 to have a first segment 48 of the loop 46 of the cord first end 42 pinch a second segment 50 of the loop 46 of the cord first end 42 against the main tube 22 and/or the cord tube 24, thereby holding the cord 26 in place.

Referring now to FIGS. 5a-5c, a side, front, and bottom view of a first embodiment of a fastening device are shown. The distal portion 52 of the main tube 22, including the cord tube 24, may be as shown and described in FIGS. 1-3. The proximal portion 54 of the main tube 22 is constructed and arranged to secure the fastening device 20 to a foundation element, such as by including one or more notches 58 (for example, four notches 58 are shown in FIG. 5c) in the terminal portion 59 for removably attaching the fastening device 20 to a foundation element. The configuration of the main tube proximal portion 54, therefore, includes an attachment means for removably affixing the fastening device 20 to the foundation device. In the non-limiting example of FIGS. 5a-5c, the attachment means is the one or more notches 58. For example, the foundation device may be a fishing rod holder such as those that are integrated with gunwales of a boat. Such fishing rod holders typically include one or more ridges or bars at the bottom that are matable with the one or more notches 58 in the proximal portion 54 of the fastening device 20. However the main tube proximal portion 54 may be configured to be removably affixed to a variety of foundation devices, such as brackets, tracks, receivers, and trailer hitches, as described in greater detail below, such as by having attachment means like a flat or smooth terminal portion, a socket, a flange, or the like. Further, as seen in FIG. 5a, the main tube 22 may include a receiver hole 62 located below the first opening 32 or second opening 34 of the main tube 22. The receiver hole 62 may be used to hide or store the excess free length of the cord 24 (that is, the cord first end 42) when the fastening device 20 is in use.

Figure 6:
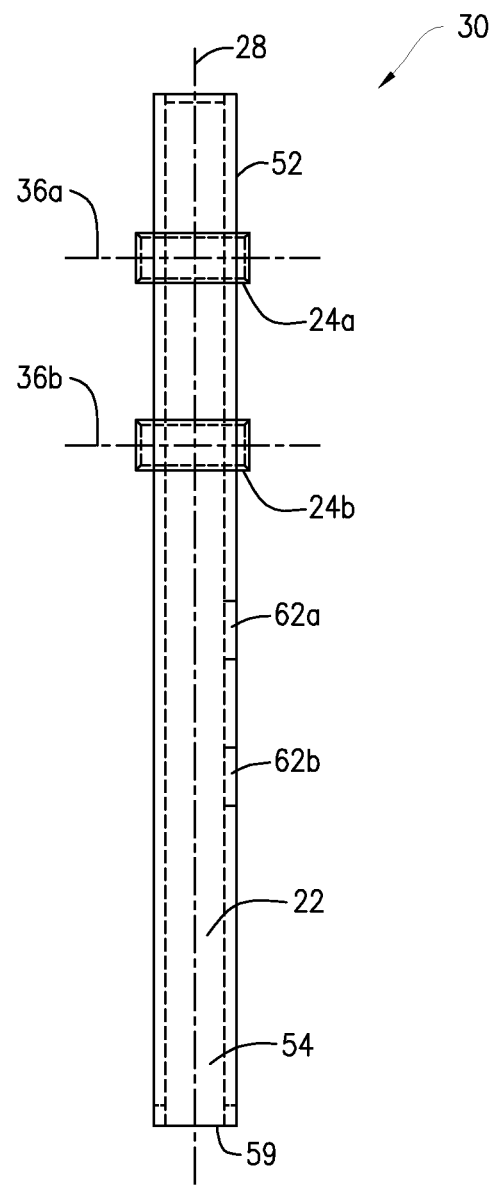
FIG. 6 shows a side view of a second embodiment of a fastening device.

Referring now to FIG. 6, a side view of a second embodiment of a fastening device is shown. The fastening device 20 of FIG. 6 is generally as shown and described in FIGS. 5a-5c, except that the main tube 22 of the device 20 in FIG. 6 includes two cord tubes 24a, 24b. Each cord tube 24a, 24b may define a major axis 36a, 36b. However, any number of cord tubes may be included. Additionally, the main tube 22 may include more than one receiver hole 62a, 62b for hiding or storing multiple cords 26. Further, the terminal portion 59 may be flat and not include notches or ridges.

Figures 7A, 7B:
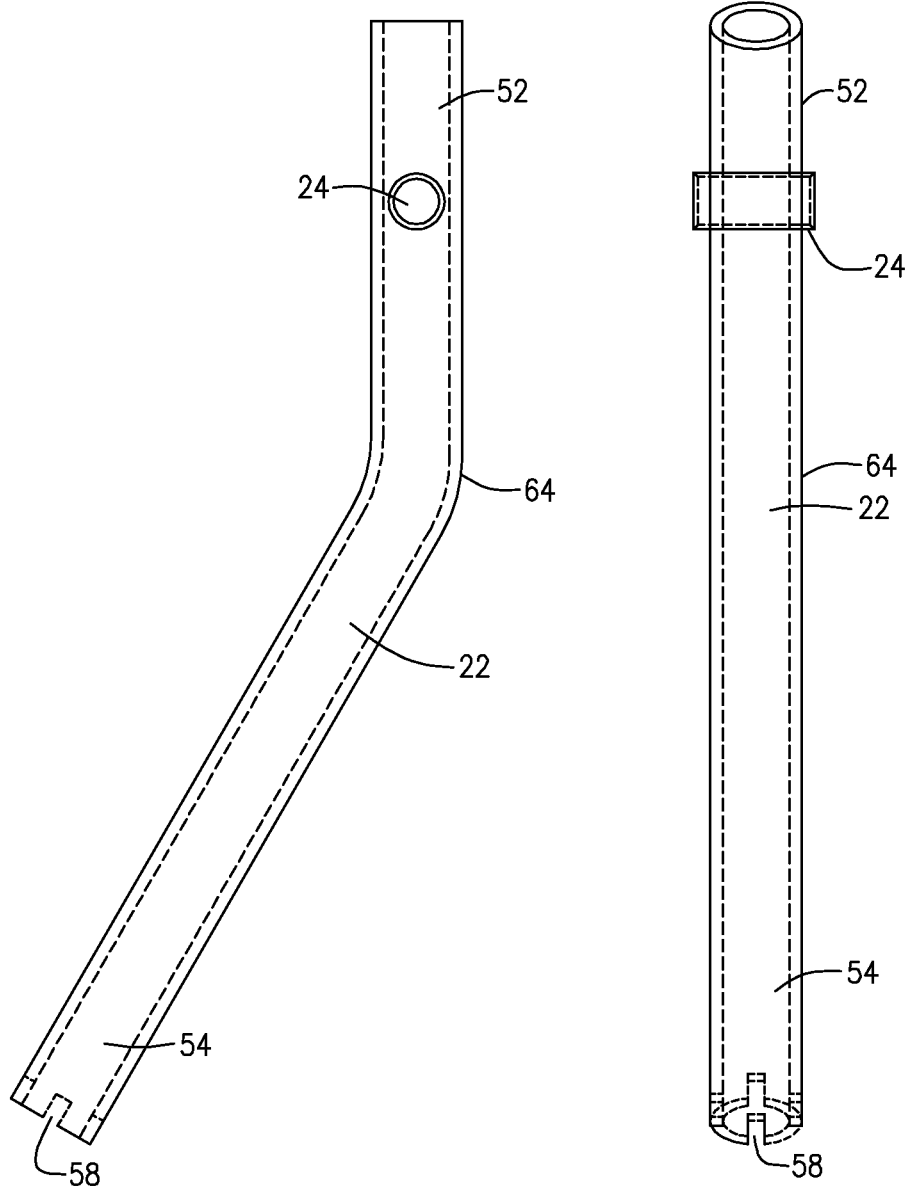
FIG. 7a shows a side view of a third embodiment of a fastening device.
FIG. 7b shows a front view of a third embodiment of a fastening device.

Referring now to FIGS. 7a and 7b, a side and front view of a third embodiment of a fastening device are shown. The distal portion 52 of the main tube 22, including the cord tube 24, may be as shown and described in FIGS. 1-3. The proximal portion 54 of the main tube 22 may includes a one or more notches 58, as shown and described in FIGS. 5a-6. However, the main tube 22 of the fastening device 20 shown in FIGS. 7a and 7*b* includes a bend 64. A bent main tube 22 is advantageous for mounting the fastening device 20 to foundation devices that are not oriented at an optimal angle for attaching a straight main tube 22 and having it bear a load effectively. For example, if a rod holder is oriented at a 30° angle to the deck of a boat, inserting a bent main tube 22 having a 30° bend into the rod holder allows the top of the bent main tube 22 to be orthogonal to the deck. Such an orientation allows for optimal fastening conditions for loads parallel to the deck of the boat and minimizes chafing of the cord 26 for loads in this direction. The bend may have any angle, as a non-limiting example, between approximately 5° and approximately 90°.

Figure 8A:
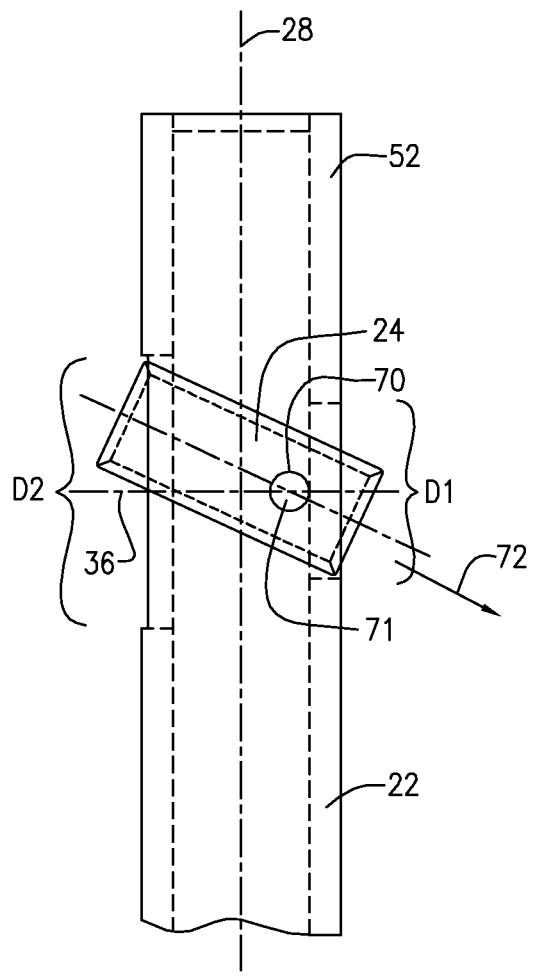
FIG. 8a shows a first side view of a fourth embodiment of a fastening device.
Figure 8B:
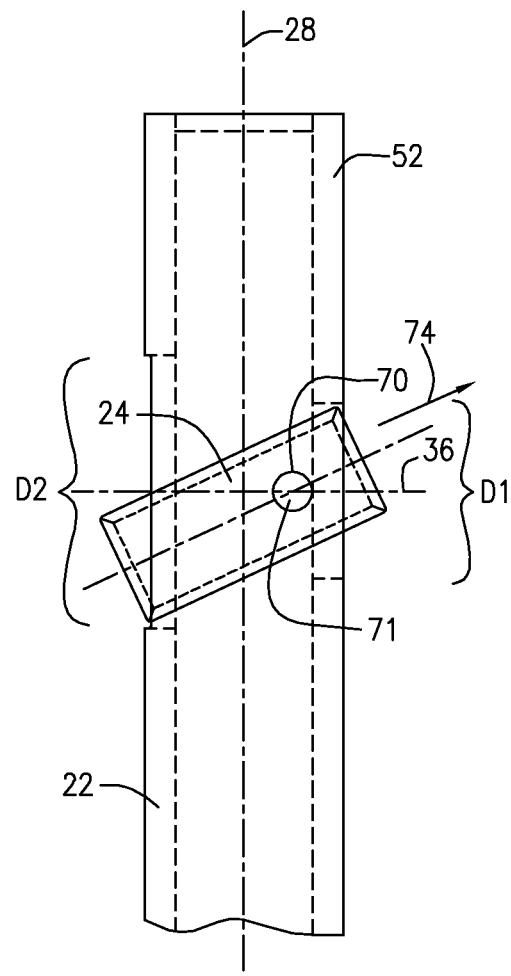
FIG. 8b shows a second side view of a fourth embodiment of a fastening device.

Referring now to FIGS. 8*a*-8*b*, side views of a fourth embodiment of a fastening device are shown. The main tube 22 may generally be as shown and described in FIGS. 1-6, but the first opening 32 of the through hole 30 may have a different diameter than the second opening 34 of the through hole 30. For example, the first opening diameter D1 may be less than the second opening diameter D2, as shown in FIGS. 8*a* and 8*b*. Further, the cord tube 24 may generally be as shown and described in FIGS. 1-6, but may include a pivot point 70 about which the cord tube 24 may pivot, the pin also securing the pivotable cord tube 24 to the main tube 22. The pivot point 70 may be achieved with the use of one or more pins 71 that connect a portion of the cord tube 24 to a portion of the main tube 22 but do not obstruct movement of the cord 26 through the cord tube 24. The pivotable cord tube 24 may sweep through a plane defined by the first axis 28 and the second axis 36. The degree of deflection of the cord tube 24 may be defined by the diameters D1 and D2 and the length (referred to as L) of the cord tube 24. The pivotable cord tube 24 may allow the fastening device 20 to be self aligning so that the cord 26 orients the pivotable cord tube 24 in the direction of the load. For example, as seen in FIG. 8*a*, when the load is applied in direction indicated by the arrow 72, the pivotable cord tube 24 is aligned to match. When, as seen in FIG. 8*b*, the orientation of the load is altered to be in direction indicated by the arrow 74, the pivotable cord tube 24 self-aligns to match this new load orientation. Self alignment helps to minimize chafing of the cord 26. In use, the cord 26 may be attached as shown and described in FIGS. 1-3. Further, the fastening device 20 of FIGS. 8*a* and 8*b* may be removably secured to a foundation device in any manner described herein.

Figure 9:
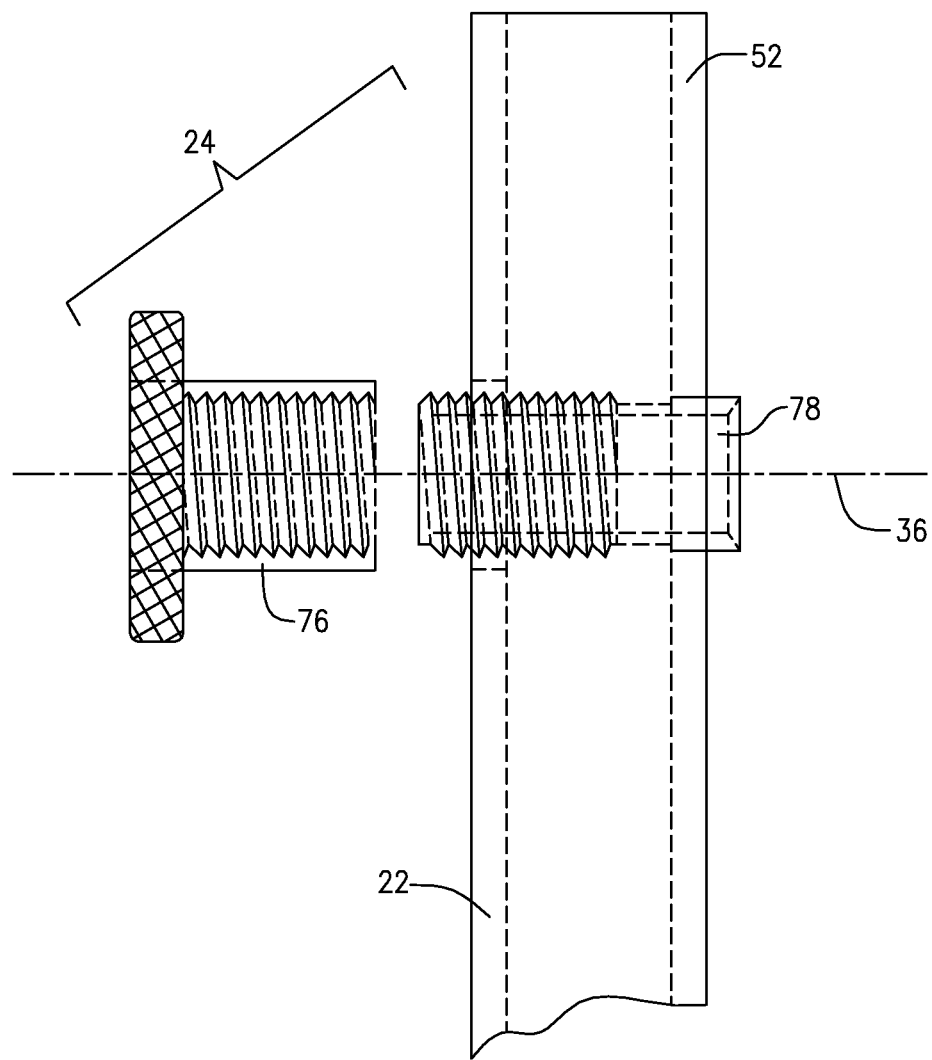
FIG. 9 shows a side view of a fifth embodiment of a fastening device.

Referring now to FIG. 9, a side view of a fifth embodiment of a fastening device is shown. The fastening device 20 as shown in FIG. 9 includes a main tube 22 and a cord tube 24. However, the cord tube 24 may include a cord tube first component 76 and a cord tube second component 78. The cord tube first component 76 may define a threaded receiving bore and the cord tube second component 78 may define a threaded portion, such that the cord tube first component 76 may screw onto the cord tube second component 78 through the main tube 22. The main tube 22 may be, for example, an existing tube or pipe on a structure such as a rail or stanchion. Alternatively, a main tube 22 as shown and described herein may be used. The overall length of the cord tube 24 changes with the degree to which the cord tube first component 76 is screwed onto the cord tube second component 78. Since the holding power of the fastening device 20 is optimized when the cord tube 24 protrudes from the second opening 34 of the main tube 22 by approximately 30% the diameter of the cord 26, the adjustable length cord tube 24 allows a wide range of cord thicknesses to be used with the fastening device 20 while achieving optimal holding power.

Figure 10:
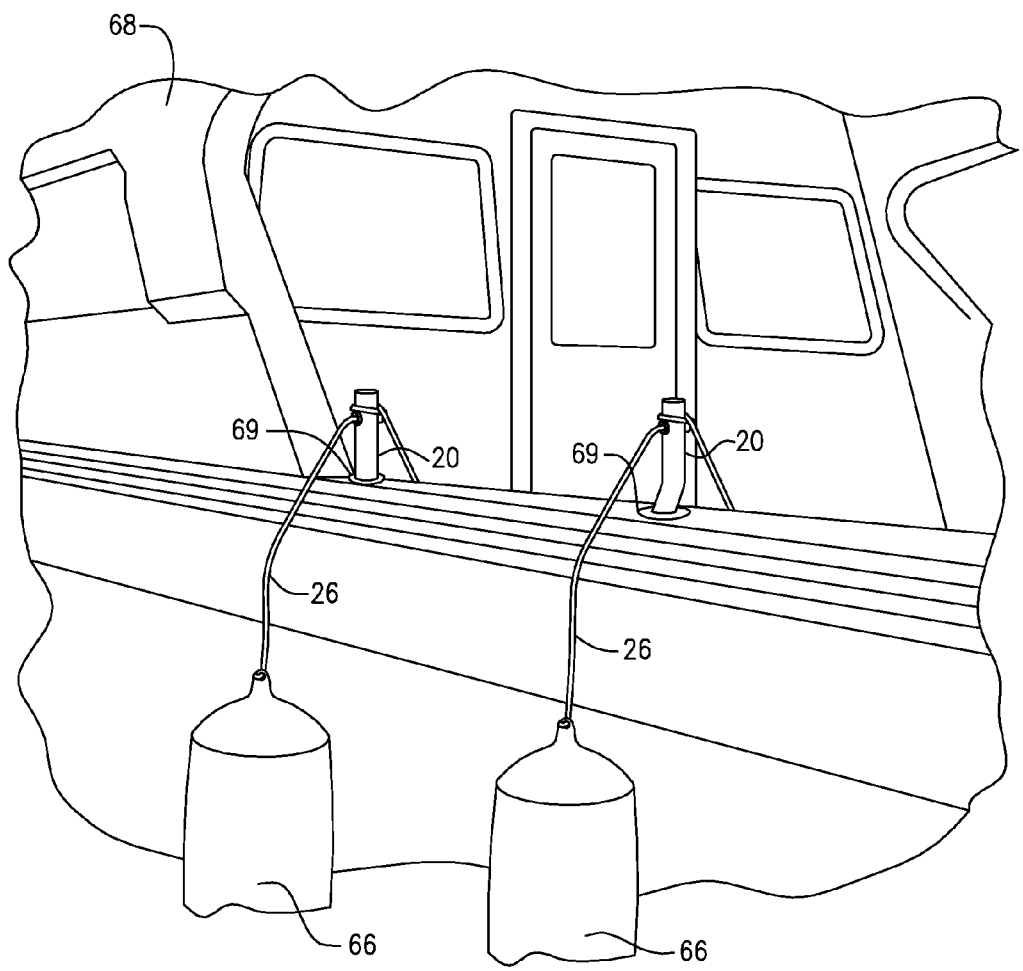
FIG. 10 shows a first embodiment of an assembly including a fastening device and foundation device.

Referring now to FIG. 10, a first embodiment of an assembly including a fastening device and foundation device is shown. As described above, the fastening device 20 may be configured to be removably attached to a variety of foundation devices. When in use, the fastening device 20 may be used, for example, to attach a fender or bumper 66 to a boat 68, as shown in FIG. 10. In this non-limiting example, the foundation element is a boat 68. The fender 66 may be attached to a rope 26 and hung off the side of the boat 68 using a fastening device 20, such as those shown and described in FIGS. 1-6. The proximal portion 54 of the fastening device 20 may be securely fastened to a rod holder 69 on the boat, for example, as described regarding FIGS. 1-3. The free end of the rope 26 (that is, the end not tied to the fender) is the cord first end 42 and may be passed through the cord tube 24 from the side facing the load (i.e., fender), which will be referred to as the cord tube first opening 38. The rope 26 may be drawn through the cord tube 24 until a desired working length remains. The rope 26 may then be looped around the distal portion 52 of the main tube 22 just above or below the cord tube 24 so as to pinch the rope 26 at the cord's 26 exit point from the cord tube 28, which will be referred to as the cord tube second opening 40, and drawn tight from the side opposite the load.

After the boat fender is secured to the boat by way of the fastening device 20, it may be desirable to adjust the working length of the rope 26 (i.e., to change the length of rope 26 between the fender and the fastening device 20). If a decrease in the working length of the rope 26 is required, the rope 26 may be drawn further through the cord tube 24 by pulling on the rope 26 from the side opposite the load thereby shortening the distance to the load. If an increase in the working length of the rope 24 is required, the loop 46 may be loosened and the cord drawn through the cord tube 24 towards the load. In both examples of adjusting the working length of the rope 26, the fender (or other load) is securely fastened by a light pull on the free end of the rope 26 to tighten the loop 46.

Figure 11:
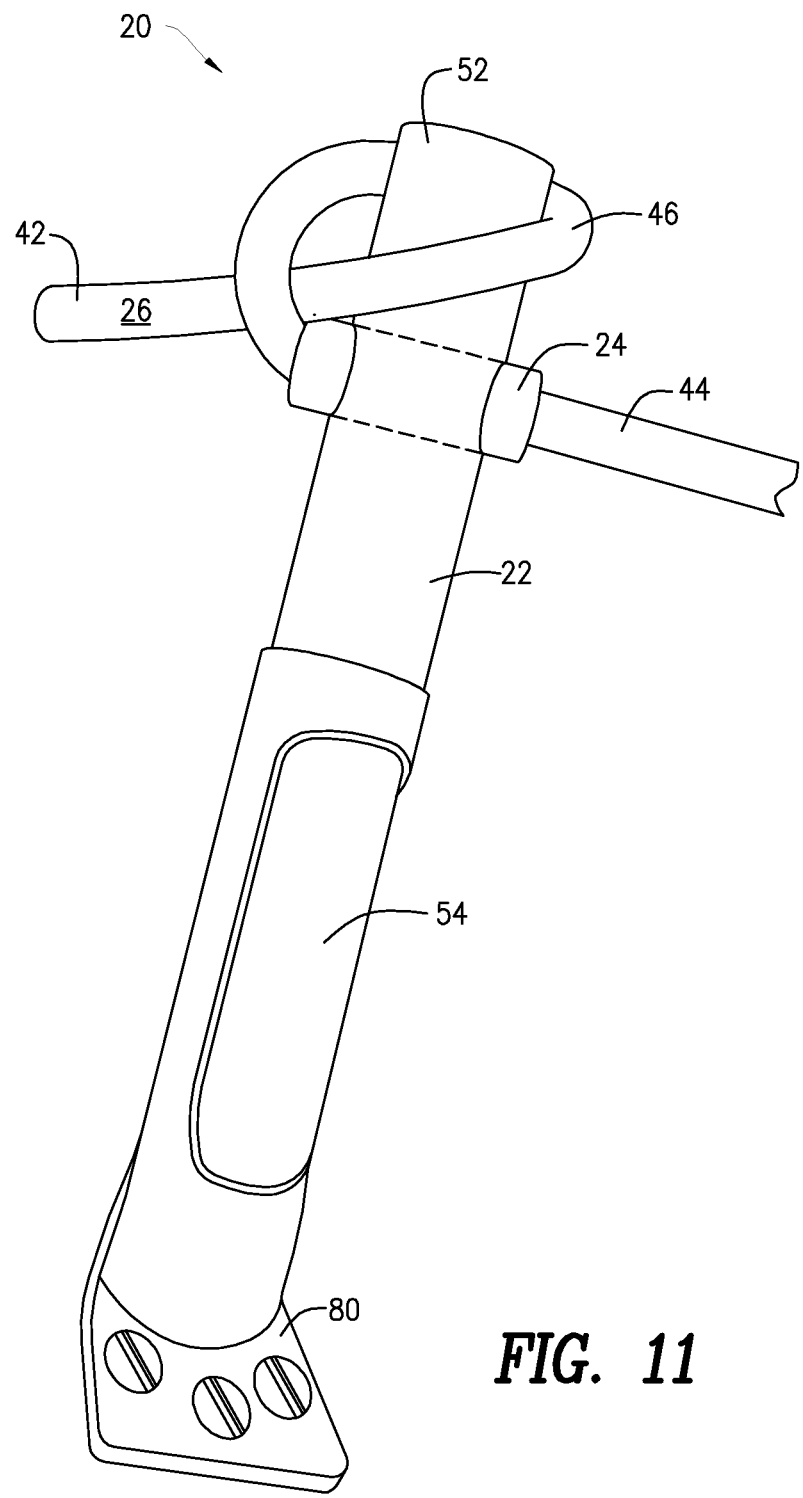
FIG. 11 shows a second embodiment of an assembly including a fastening device and foundation device.

Referring now to FIG. 11, a second embodiment of an assembly including a fastening device and foundation device is shown. In the non-limiting assembly shown in FIG. 11, the proximal portion 54 of the main tube 22 may have a flat (that is, not notched) end for being received within a bracket 80, such as a typical flag pole bracket. In this example, the foundation device is a bracket 80. The bracket 80 may be affixed to a building, vehicle, or other device. For example, the bracket 80 is shown in FIG. 11 as being screwed to the side of a building; however, the bracket may be permanently or removably affixed to the structure or vehicle. Alternatively, the proximal portion 54 of the main tube 22 may have a convex or concave end (not shown). Such an assembly that includes a fastening device 20 and bracket 80 may be useful when an item needs to be attached to a wall, side of a building, or vehicle. For example, this assembly may be used to attach a sunshade to an outside wall of a house. This assembly may also be used, for example, to securely tie a horse or other animal to a post or barn wall. In that case, the animal could be quickly released by either loosing the loop of cord 26 or removing the fastening device 20 from the bracket 80.

Figure 12:
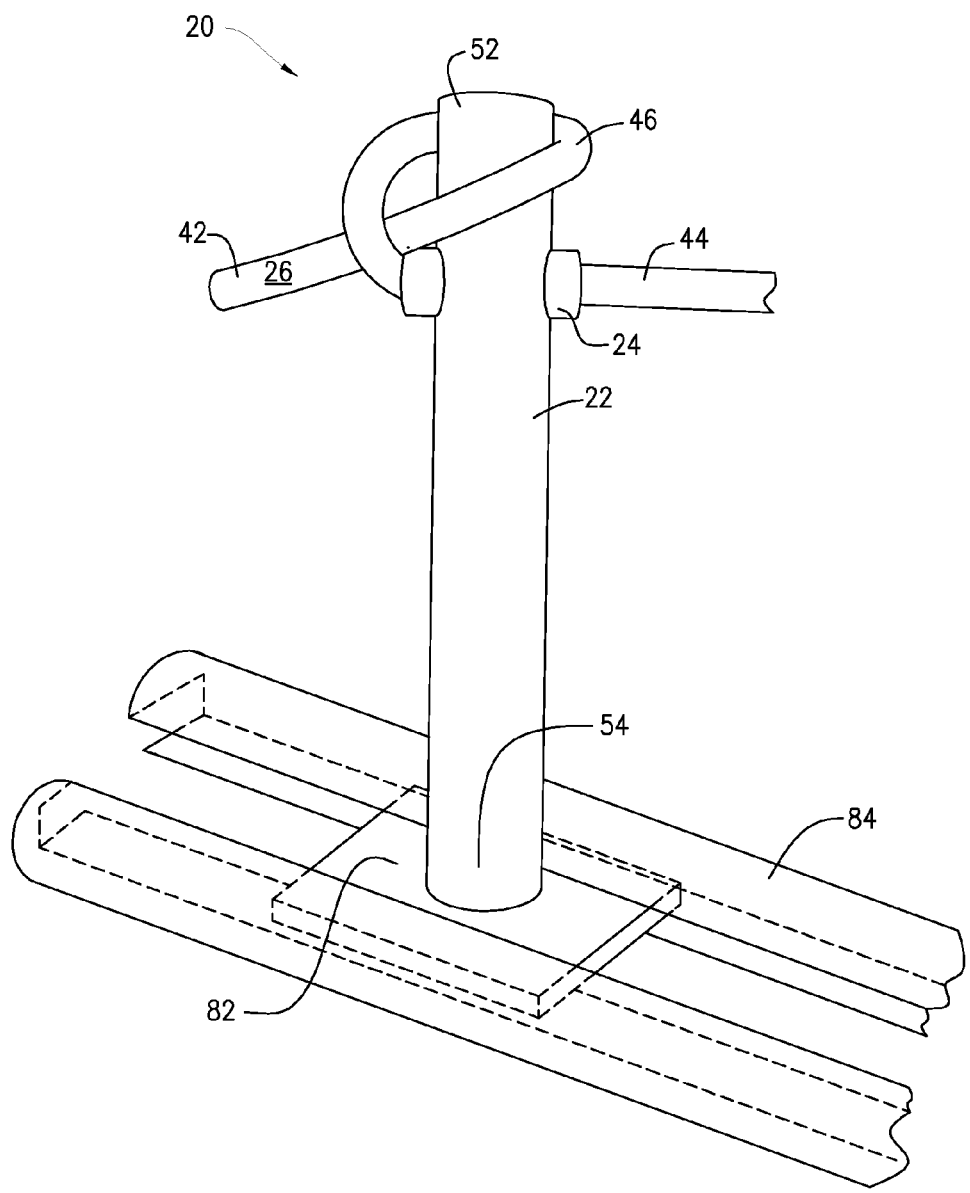
FIG. 12 shows a third embodiment of an assembly including a fastening device and foundation device.

Referring now to FIG. 12, a third embodiment of an assembly including a fastening device and foundation device is shown. In the non-limiting assembly shown in FIG. 12, the proximal portion 54 of the main tube 22 may include a flat, disk-shaped flange 82 that is sized to fit under a one or more lips of a track 84, so as to prevent the fastening device 20 from becoming uncoupled from the track 84. In this example, the foundation device is a track 84. Optionally, the proximal portion 54 of the main tube 22 may also include a rollerball or similar device to facilitate sliding the fastening device 20 along the track 84 (not shown). The track 84 may be affixed to a flat surface, such as a boat deck, the upper boat gunwale surface or upper surface of a pick-up truck bed wall, a wall of a building, or the like. The fastening device 20 may be moved along the track 84 to place the fastening device 20 in a desired position. Additionally, the track may include one or more adjustable stops or braces for locking the fasting device 20 in place (not shown).

Figure 13A:
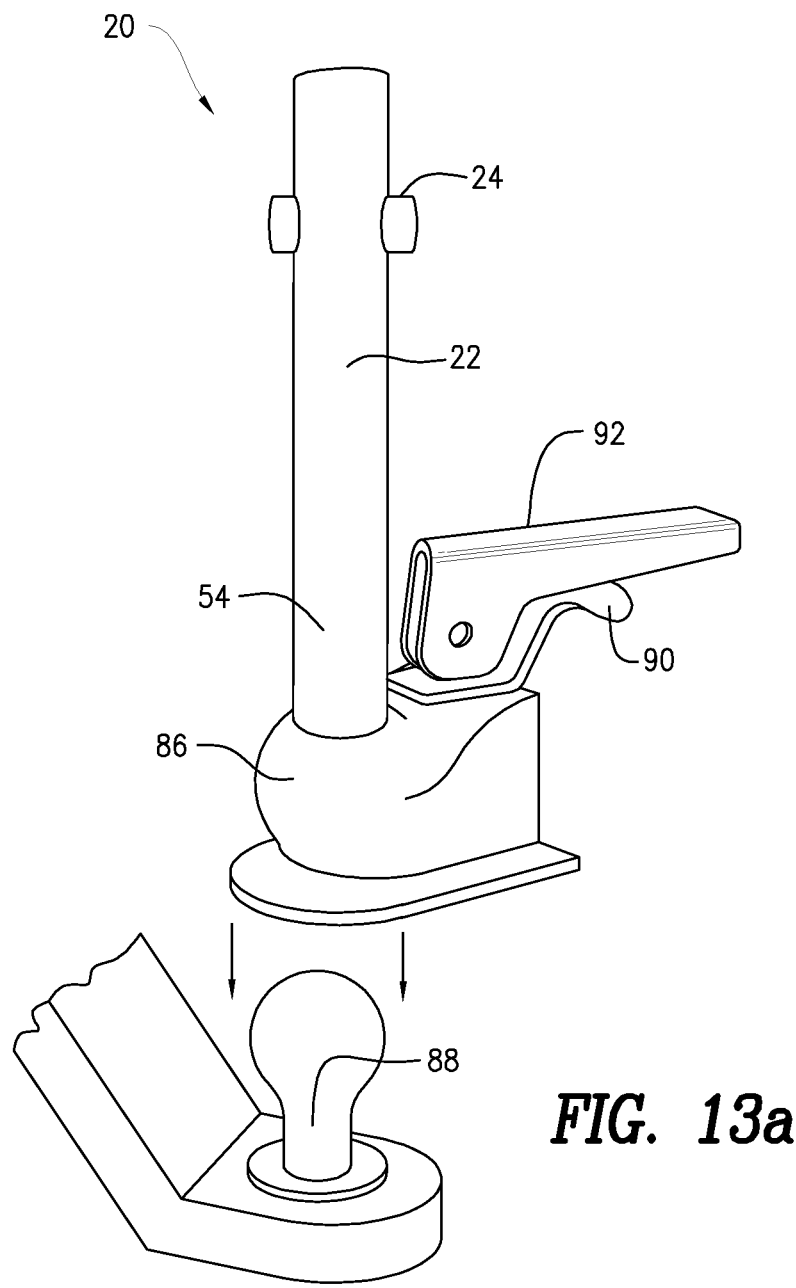
FIG. 13a shows a first embodiment of a fourth embodiment of an assembly including a fastening device and foundation device.
Figure 13B:
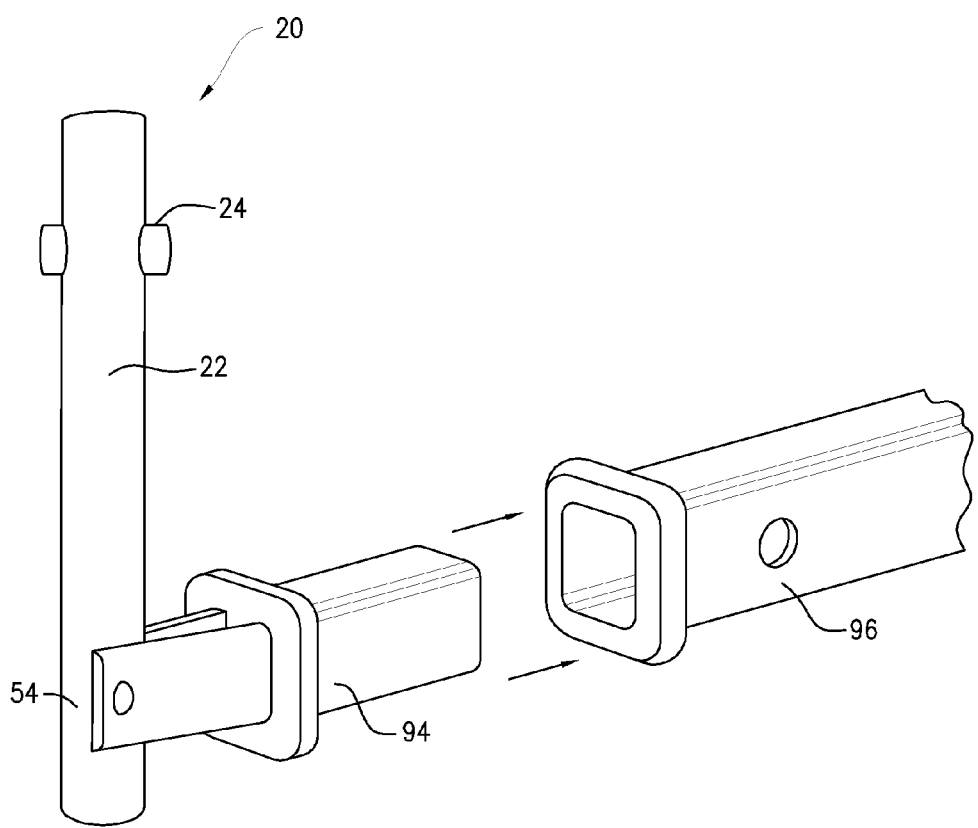
FIG. 13b shows a second embodiment of a fourth embodiment of an assembly including a fastening device and foundation device.

Referring now to FIGS. 13*a* and 13*b*, a first and second embodiment of a fourth embodiment of an assembly including a fastening device and foundation device are shown. In the non-limiting assembly shown in FIGS. 13*a* and 13*b*, the foundation device is a trailer hitch. The fastening device 20 may be configured to be removably affixed to a standard trailer hitch, as shown in FIG. 31*a*, wherein the proximal portion 54 of the main tube 22 may include a socket 86 sized to be disposed about a ball-style trailer hitch 88, such as those commonly coupled to trucks and SUVs. The socket may include a wedge and latch assembly, wherein actuation of the latch 90 moves a wedge or lever 92 underneath the ball of a ball-style trailer hitch for securing the fastening device 20 to the hitch 88. In the second embodiment shown in FIG. 13*b*, the fastening device 20 may include an arm 94 that is sized to be disposed within a receiver hitch 96. The arm 94 may substantially orthogonal to the first axis 28 of the main tube, or may be affixed to the main tube 22 at any angle to the first axis 28 that is suitable for being received with the receiver hitch 96 while maintaining the main tube 22 in a substantially upright position. Additionally, the arm 94 may be adjustable attached to the main tube 22 so the angle of attachment between the arm 94 and main tube 22 may be adjusted. For example, the arm 94 may be pivotally attached to the main tube 22.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims. For example, it will be understood that a fastening device 20 may be created using an existing pole, stanchion, post, pipe, or the like. As a non-limiting example, a through hole 30 may be machined into the existing structure that has a diameter that is large enough to accommodate a cord tube 24 within (for example, a cord tube as shown and described in FIGS. 1-9). The inner diameter of the cord tube 24 may be chosen based on the diameter of the cord or line 26 that is used. Once the through hole 30 is created, the cord tube 24 may be rigidly affixed within the through hole 30 by using adhesive bonding, friction fitting, threading, welding, or other suitable means. The length of the cord tube 24 may depend on the diameter of the existing structure and the diameter of the cord 26, so that the cord tube 24 is long enough to protrude from at least the second opening 40 of the through hole 30 by, for example, approximately 30% of the diameter of the cord 26. The cord tube may also extend beyond the first opening 38 in a similar manner.

Additionally, while the fastening device 20 is describe above as utilizing the cord tube 28 to maximize holding power, the cord tube 28 may be omitted from the fastening device 20 and still provide a strong hold.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A fastening device comprising:
 a first tube defining a first major axis, a distal portion, a proximal portion, an inner diameter, and a through hole, the through hole defining a first opening and a second opening, the proximal portion of the first tube including an attachment element; and
 a second tube disposed within the through hole of the first tube, the second tube defining an inner diameter and a second major axis that is substantially orthogonal to the first major axis, the second tube extending beyond the first opening of the first tube by a first distance and extending beyond the second opening of the first tube by a second distance, each of the first distance and the second distance being between approximately 10% and approximately 50% of the inner diameter of the second tube; and
 a cord inserted through the through hole, the cord defining a cord first end and a cord second end, the cord first end disposed on a side of the through hole corresponding to the first opening, the cord second end disposed on a side of the through hole corresponding to the second opening, the cord first end being looped over the distal portion of the first tube,
 a first segment of the cord first end being configured to pinch a second segment of the cord first end against the first tube to lock the cord in place when the cord is pulled from the cord second end, and
 the cord being configured to move through the through hole in a direction from the second opening to the first opening when the cord is pulled from the cord first end.

2. The fastening device of claim 1, wherein the distal portion of the first tube includes a distal end lying in a plane that is substantially orthogonal to the first major axis and the proximal portion of the first tube includes a proximal end lying in a plane that is substantially orthogonal to the first major axis, the attachment element being a plurality of notches in the proximal end.

3. The fastening device of claim 1, wherein the attachment element includes a flange.

4. The fastening device of claim 1, wherein the attachment element includes a socket.

5. The fastening device of claim 4, wherein the attachment element further includes a wedge and a clamp.

6. The fastening device of claim 1, wherein the attachment element includes an arm that defines an axis that is substantially orthogonal to the first major axis of the first tube.

7. The fastening device of claim 1, wherein the attachment element includes an arm that is pivotally attached to the first tube.

8. The fastening device of claim 1, wherein the first tube has a bend of between approximately five degrees and approximately ninety degrees.

9. The fastening device of claim 1, wherein the second tube defines a second tube length, the second tube including a first component and a second component, the first component being adapted to screw into the second component, the distance over which the first component is screwed into the second component determining the second tube length.

10. The fastening device of claim 1, further comprising two second tubes, the first tube defining two through holes, each second tube being disposed within a through hole.

11. The fastening device of claim 1, further comprising one or more pins disposed through at least a portion of the first tube and at least a portion of the second tube, the one or more pins pivotally coupling the second tube to the first tube.

12. The fastening device of claim 1, wherein the through hole comprises a first opening and a second opening, the one or more pins being at a location that is offset from the first axis and closer to the first opening of the hole than the second opening of the hole, the first opening of the hole being less than the second opening of the hole.

* * * * *